(12) United States Patent
Delamarche et al.

(10) Patent No.: US 7,491,272 B2
(45) Date of Patent: Feb. 17, 2009

(54) CONFINEMENT OF LIQUIDS ON SURFACES

(75) Inventors: Emmanuel Delamarche, Thalwil (CH); David Juncker, Zurich (CH); Heinz Schmid, Waedenswil (CH)

(73) Assignee: International Business Machines Corporation, Armonk, NY (US)

(*) Notice: Subject to any disclaimer, the term of this patent is extended or adjusted under 35 U.S.C. 154(b) by 543 days.

(21) Appl. No.: 10/537,536

(22) PCT Filed: Nov. 13, 2003

(86) PCT No.: PCT/IB03/05128

§ 371 (c)(1),
(2), (4) Date: Nov. 1, 2005

(87) PCT Pub. No.: WO2004/050245

PCT Pub. Date: Jun. 17, 2004

(65) Prior Publication Data

US 2006/0127579 A1  Jun. 15, 2006

(30) Foreign Application Priority Data

Dec. 5, 2002 (EP) .................................. 02027180
Apr. 24, 2003 (EP) .................................. 03009334

(51) Int. Cl.
*B05C 3/00* (2006.01)
(52) U.S. Cl. ........................... 118/401; 118/412
(58) Field of Classification Search ............ 118/401, 118/412, 264, 270; 222/585; 401/120; 427/256, 427/286, 287, 284; 422/100; 425/130, 375, 425/449
See application file for complete search history.

(56) References Cited

U.S. PATENT DOCUMENTS

| | | | | |
|---|---|---|---|---|
| 3,413,143 A | * | 11/1968 | Cameron et al. | 427/402 |
| 6,620,625 B2 | * | 9/2003 | Wolk et al. | 436/180 |
| 2001/0053334 A1 | * | 12/2001 | Chen et al. | 422/50 |
| 2002/0115068 A1 | * | 8/2002 | Tomlinson et al. | 435/5 |
| 2002/0187468 A1 | * | 12/2002 | Jentsch et al. | 435/6 |
| 2003/0080143 A1 | * | 5/2003 | Kale et al. | 222/1 |

* cited by examiner

*Primary Examiner*—Brenda A Lamb
(74) *Attorney, Agent, or Firm*—Vazken Alexanian

(57) ABSTRACT

A microfluidic device for applying a liquid to a surface comprises a chamber for carrying the liquid, an aperture in the chamber for communicating liquid from the chamber to the surface via a conduit having outer sides of limited wetability to the liquid. This device provides a solution for confining liquids to defined areas of a surface without involving physical seals and additionally permits moving the device and confined liquid on the surface.

1 Claim, 4 Drawing Sheets

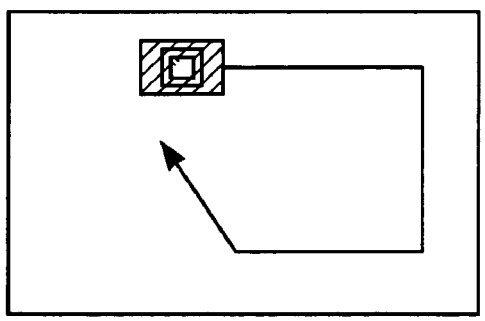
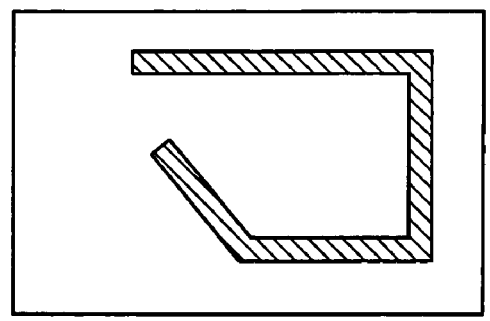
Fig. 13  Fig. 14
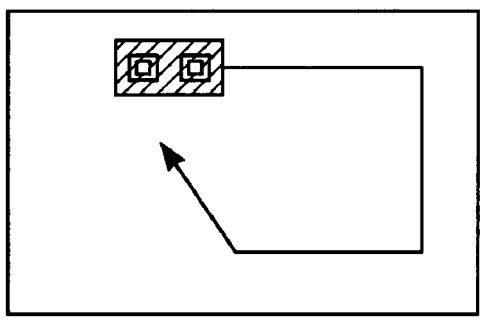
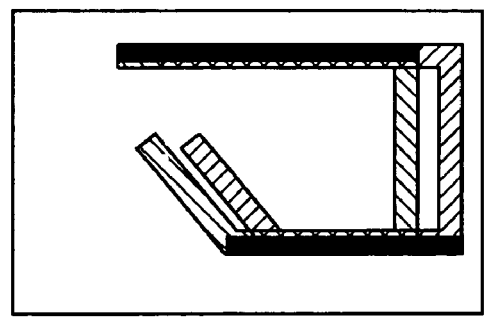
Fig. 15  Fig. 16
Fig. 17
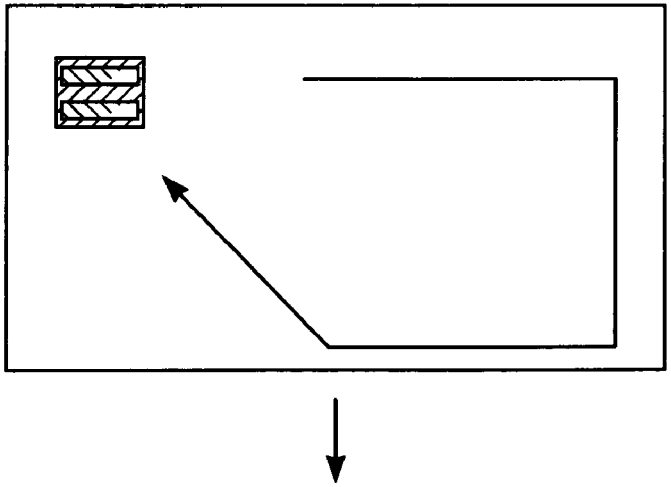
Fig. 18
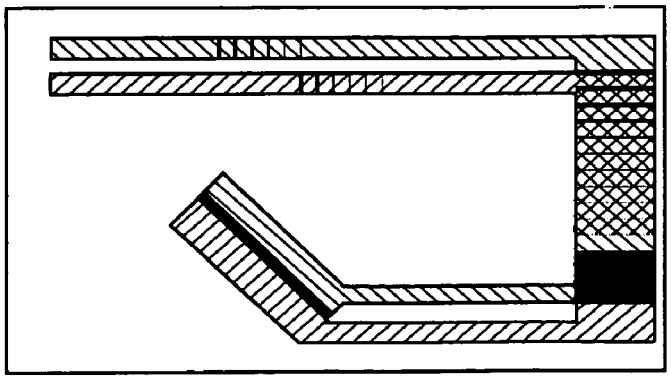

CONFINEMENT OF LIQUIDS ON SURFACES

CROSS REFERENCE AND PRIORITY

This application filed under 35 USC 371, is cross-referenced with, and claims priority from, International Patent Application PCT/IB2003/005128 filed on Nov. 13, 2003, and published in English with Publication No. WO 2004/050245 on Jun. 17, 2004, under PCT article 21(2), which in turn claims priority of EP02027180.5, filed on Dec. 5, 2002 and EP03009334.8 filed on Apr. 24, 2003.

The present invention generally relates to confinement of liquids on surfaces and particularly relates to methods and apparatus for applying and confining liquids to surface areas.

There are many applications in which it is desirable to apply a liquid to a surface. An example of such an application is in patterning or other processing of surfaces. Patterning and processing of surfaces with liquids is becoming increasingly important in a range of fields, including chemistry, biology, biotechnology, materials science, electronics, and optics. Patterning a surface by applying a liquid to the surface typically involves confinement of the liquid to defined regions of the surface.

A surface is typically wettable by a liquid if the contact angle between a drop of the liquid and the surface is less than 90 degrees. A channel for carrying a liquid is typically wettable if the channel exerts a negative pressure on the liquid when partially filled. Such a negative pressure promotes filling of the channel by the liquid. In a channel having a homogeneous surface, a negative pressure arises if the contact angle between the liquid and the surface is less than 90 degrees. A surface is typically regarded as more wettable if the contact angle between the surface and the liquid is smaller and less wettable if the contact angle between the surface and the liquid is higher.

One conventional surface patterning technique is lithography. In lithography, a mask is usually applied to the surface to be patterned. Apertures are formed in the mask to define regions of the surface to be exposed for treatment. Those areas of the surface remaining covered by the mask are protected from treatment. The mask is typically formed from a patterned layer of resist material. The surface carrying the mask is then typically immersed in a bath of chemical agents for treating the exposed regions of the surface. Lithography is a relatively expensive process to perform, involving multiple steps, expensive instruments and laboratory facilities with controlled environments. With the possible exception of in situ synthesis of short DNA strands, lithography is generally unsuitable for handling and patterning biomolecules on surfaces. Lithography is also unsuitable for simultaneously processing surfaces with different chemicals in parallel, as described by Whitesides, *Annu. Rev. Biomed.* 3 (2001), 335-373. There can be incompatibility between different process steps or chemicals used in lithography and between various surface layers processed by lithography.

Another conventional surface patterning technique is drop delivery. Drop delivery systems, such as pin spotting systems, ink jet systems, and the like, typically project a relatively small volume of liquid onto a specific location on a surface. See Shena, M., *"Microarray biochip technology"*. Eaton Publishing 2000. However, these systems have limited resolution due to spreading of dispensed drops on the surface. Additionally, the quality of patterns formed by such systems is strongly limited by drying of the delivered liquid, as described by Smith, J. T., *"Spreading Diagrams for the Optimization of Quill Pin Printed Microarray Density"*, Langmuir, 18 (2002), p 6289-6293. These systems are not generally useful for dissolving or extracting materials from a surface. Additionally, these systems do not facilitate a flow of liquid over a surface. Furthermore, these systems are not suited to process a surface sequentially with several liquids.

PCT WO 01/63241 A2 describes a surface patterning technique involving a device having a channel with a discharge aperture. A matching pillar is engaged with the discharge aperture to promote deposition of molecules on the top surface of the pillar. A disadvantage with this device is that it is not possible to vary patterning conditions for different pillars individually.

Exposure of the surface to the liquid needs to be sufficiently long to allow reagents to reach the surface by diffusion. The method also requires a surface with pillars matching the aperture. Precise alignment of the device with the pillars before engagement is required. Spacing between the discharge aperture and the pillars needs external control. The pillars cannot be moved on the surface to draw lines.

Yet another conventional surface patterning technique involves application of a microfluidic device to the surface. An example of such a device is described in U.S. Pat. No. 6,089,853. The device described therein can establish a flow of liquid over a surface. The flow can be created via capillary action in the device. The device can treat a surface with different liquids in parallel. However, the device must be sealed to the surface in the interests of confining the liquid to the region of the surface to be treated. Such confinement allows the formation of patterns with relatively high contrast and resolutions. These are desirable qualities where biomolecules are patterned on a surface for biological screening and diagnostic purposes. In addition, the device must be placed on the surface to be treated and sealed around the processing regions before it can be filled with treatment liquid. If the flow is created by capillary action, other problems arise. For example, service ports in the device must be filled with treatment liquid for each patterning operation. In addition, only one liquid can be delivered to each channel in the device. The liquid cannot be flushed out of the channels before separation of the device from the surface. Furthermore, the treatment liquid tends to spread away from the regions of the surface to be treated during removal of the device from the surface. Also, the device is not suitable for processing a surface sequentially with several liquids. If the flow is created by external actuation, such as pressurization, electric fields, or the like, then other problems arise. For example, an individual connection from the actuator must be made to each channel in the device. Such connections to peripheral equipment limit the density of channels that can be integrated into the device and individually addressed. Pumping, valving, and control complexity increases as the number of channels increases. External connections create dead volume between the device and external actuators because of the intervening conduits.

Another microfluidic device for localized processing of a surface is described in *IBM Technical Disclosure Bulletin reference RD n446* Article 165 Page 1046. This device is similar to that described in U.S. Pat. No. 6,089,853. The device permits several liquids to be flushed in sequence over the same surface area without requiring separation of the device from the surface. Such a device is thus useful for chemical and biological reactions involving the sequential delivery of several liquids. A disadvantage associated with this device however is that it must be sealed around the region of the surface to be treated before filling. Another disadvantage is that the liquids cannot be filled prior to application on the device to the surface. Each additional step requires supplementary filling of the relevant liquid. The lines need to be prestructured in the device via lithography and cannot be readjusted subsequently.

Another conventional device for confining liquids to a predefined pattern between a top and bottom surface without involving a seal is described in European Patent 0 075 605. This device is useful for performing optical analysis of a liquid trapped between the top and bottom surface. However, the device requires predefined topographical or chemical patterns on both the top and bottom surfaces. Also, the device, having no inlet or outlet ports, is not suitable for the transport of liquids.

Another device for guiding liquids along a predetermined path is described in WO 99/56878. This device can flow several liquids simultaneously over a surface without involving seal to confine the liquids. However, a disadvantage of this device is that separation gaps between paths have to be capillary inactive. This limits path sizes to greater than 1 mm. Otherwise, meniscus pressures produce uncontrolled spreading of liquid. Another disadvantage of this device is that liquid is not retained after separation and can instead spread over the surface. A further disadvantage of this device is that liquid delivery requires an external connection to each path. Cumbersome peripheral flow control devices are also required.

Yet another method for guiding liquid along a surface without involving a seal is described in Zhao et al., *Science*, Vol. 291 (2001), p. 1023-1026. Here, the surface is patterned with a wettability pattern. Specifically, two wettable paths mirroring each other are defined on otherwise non-wettable top and bottom surfaces. This produces "virtual" channels without lateral walls that can have micrometer width. A disadvantage of this method is that it requires wettability patterns on both the top and bottom surfaces. In other words, the path for the flow of liquid must be predetermined using lithography, which is expensive and lacks flexibility. Furthermore, the flow paths cannot be readjusted subsequently. Additionally, the wettability contrast between the two patterns needs to be very high, and requires both non-wettable areas on the top and bottom surfaces and highly wettable areas within the virtual channel. Furthermore, the two patterns have to match each other exactly in shape and alignment. Capillary action can be used to fill the channels, but the liquid cannot be removed or exchanged. This method is also susceptible to uncontrolled spreading of liquid because it is relatively difficult to produce sufficiently non-wettable surfaces.

It would be desirable to provide a technique for confining a liquid on a surface in a more versatile and convenient manner. In accordance with the present invention, there is now provided a device for applying a liquid to a substrate surface, the device comprising a chamber for carrying the liquid, an aperture in the chamber for communicating liquid from the chamber to the substrate surface via a conduit having outer sides of limited wettability to the liquid.

Liquid dispensed from the device is confined in a volume defined by the aperture. A physical seal between the device and the substrate surface, that is, the surface to be contacted by the liquid, is not needed. In preferred embodiments of the present invention, the confinement arises through the geometry of the aperture and the superposition of a wettability pattern on the aperture and surrounding regions of the device. Such devices are especially although not exclusively useful in the application of surface treatment in the range of fields, including microelectronics, optics, biology, biochemistry, and biotechnology. The present invention also extends to an array of such devices.

In a particularly preferred embodiment of the present invention, the device has a body including a protrusion defined by the outer sides of the conduit. The conduit preferably comprises inner sides wettable by the liquid. The body preferably comprises a plane inner surface surrounding the protrusion and a plane outer surface parallel to, offset from, and surrounding the inner surface, the protrusion extending from the inner surface and having an end coplanar with outer surface. The inner surface may form a peripheral recess surrounding the protrusion. The outer surface is preferably of limited wettability to the liquid. The end of the protrusion is preferably wettable by the liquid. In some embodiments of the present invention, the outer surface may define a plane located between that defined by the inner surface and that defined by the end of the protrusion. In other embodiments of the present invention, the outer surface may be omitted altogether.

In a preferred embodiment of the present invention, the device comprises: a first chamber for carrying the liquid; a second chamber for carrying the liquid; a first aperture in the first chamber for communicating liquid from the first chamber to the substrate surface via a first conduit having outer sides of limited wettability to the liquid; and, a second aperture in the second chamber for communicating liquid from the second chamber to the substrate surface via a second conduit having outer sides of limited wettability to the liquid. The device preferably comprises a body including a protrusion defined by the outer sides of the first and second conduits. The first and second conduits may comprise inner sides wettable by the liquid. The body may comprise a plane inner surface surrounding the protrusion and a plane outer surface parallel to, offset from, and surrounding the inner surface, the protrusion extending from the inner surface and having an end coplanar with outer surface. The inner surface may form a peripheral recess surrounding the protrusion. The outer surface may be of limited wettability to the liquid. The end of the protrusion is preferably wettable by the liquid.

In one application, pressure in the chamber can be regulated such that liquid is retained in the chamber when the aperture is remote from the substrate surface. When the aperture is proximal to the substrate surface, pressure may be applied to initiate flow of liquid out of the aperture onto the surface. When the device is withdrawn from the surface, the pressure may be tuned to draw back excessive liquid from the surface. There may be a plurality of chambers each coupled to an aperture, where the pressure is controlled in each chamber, in parallel or individually.

The chamber pressure may be generated by external pumps such as syringe pumps or peristaltic pumps or other means of pressurization, by integrated pumps such as microfabricated pumps, by electro-kinetic pumping, by capillary-force based pumping, or by other pumping means. Further, there may be provided valves for controlling flow of liquid. Such valves may be located within external connections, in the chamber, in connections between chamber and aperture, or in the aperture. Such valves may be closed or opened on demand. Devices embodying the present invention may form or otherwise constitute a fluidic network. There may be a feedback system for measuring pressure within such a network, for example at apertures and/or chambers. Alternatively, there may be provided feedback based on the volume of liquid pumped. The feedback may facilitate control of flow of liquid and avoid undesired spreading of liquid on the substrate surface. There may be a plurality of chambers each coupled to an aperture, where pressure is controlled in each chamber, in parallel or individually. Further, there may be one or more valves that control the flow for each chamber in parallel or individually.

The chamber may apply a pressure for retaining the liquid when the aperture is remote from the substrate surface. The chamber may comprise a capillary network for applying pressure to the liquid. The capillary network may comprise at least one of a plurality of parallel capillary members, a mesh, a porous material, and a fibrous material. There may be a plurality of chambers each coupled to an aperture. The pressures may be such that the liquid is drawn towards the chambers in response to withdrawal of the aperture from the substrate surface. There may be a plurality of first and second chambers each coupled to the aperture, where the pressure is controlled in each chamber, in parallel or individually.

The end of the protrusion may comprise a flow path extending from a first aperture to a second aperture connected to a first chamber and a second chamber respectively. The protrusion defining the flow path may be flat, or rounded, or contain a recess of rectangular of curved cross section.

Pressure in the first chamber may be regulated such that liquid is retained in the first aperture when the flow path is remote from the substrate surface. Pressure in the second chamber may also be regulated such that the difference between the first and second pressures is oriented to promote flow of the liquid from the first chamber to the second chamber via the flow path when the flow path is located proximal to the substrate surface with the liquid in the device contacting the substrate surface. The first and second pressures can further be regulated such that excessive liquid is drawn towards at least the second chamber in response to withdrawal of the flow path from the substrate surface. There may be a plurality of first chambers each coupled to the flow path. Equally, there may be a plurality of second chambers each coupled to the flow path.

The pressure in the first and second apertures may be generated by external pumps or the like as herein before described. There may be provided a feedback system that measures the pressure within the system, for example at the first and second apertures and/or the first and second chambers. The feedback may be based on the volume of liquid pumped in the first and second chambers. The feedback may facilitate the control of the flow of liquid and avoid undesired spreading of liquid on the substrate surface. There may be a plurality of first and second chambers each coupled to first and second apertures, where pressure is controlled in each of the first and second apertures, in parallel or individually. Further, there may be one or more valves controlling flow for each of the first and second apertures in parallel or individually. There may be a plurality of first chambers each coupled to the flow path. Equally, there may be a plurality of second chambers each coupled to the flow path.

In an example of the present invention, the first chamber applies a first pressure for retaining the liquid when the flow path is remote from the substrate surface. The second chamber applies a second pressure to the liquid such that the difference between the first and second pressures is oriented to promote flow of the liquid from the first chamber to the second chamber via the flow path in response to the flow path being located proximal to the substrate surface and the liquid in the device contacting the substrate surface. The first and second pressures are such that the liquid is drawn towards at least the second chamber in response to withdrawal of the flow path from the substrate surface. At least one of the first chamber and the second chamber may comprise a capillary network for applying pressure to the liquid. The or each capillary network may comprise at least one of a plurality of parallel capillary members, a mesh, a porous material, and a fibrous material. There may be a plurality of first chambers each coupled to the flow path. Equally, there may be a plurality of second chambers each coupled to the flow path. The first and second pressures may be such that the liquid is drawn towards the first chamber and the second chamber in response to withdrawal of the flow path from the substrate surface.

Many other applications of the present invention are possible.

Devices embodying the present invention may be of unitary construction, possibly formed from any one of elastomer, silicon, SU-8 photoresist, thermoplastic, ceramic, and metal. Alternatively, devices embodying the present invention may be of layered construction, with each layer possibly formed from any one of glass, polymer, silicon, SU-8 photoresist, thermoplastic, metal, and ceramics.

Viewing the present invention from another aspect, there is now provided a method for applying a liquid to a substrate surface, the method comprising: locating a single aperture device as herein before described proximal to the substrate surface; supplying the liquid to the substrate surface via the device; and, retracting the device from the substrate surface.

Viewing the present invention from yet another aspect, there is now provided a method for applying a liquid to a substrate surface, the method comprising: locating a two aperture device as herein before described proximal to the substrate surface; supplying the liquid to the substrate surface via the device; flowing the liquid from the first chamber to the second chamber via the flow path; and, retracting the device from the substrate surface. The flow of the liquid from the first chamber to the second chamber may be varied during the supply of the liquid to the surface.

Prior to the retracting, devices as herein before described may be moved relative to the substrate surface with the liquid in the or each aperture contacting with the substrate surface.

The present invention also extends to a method for applying a liquid to a substrate surface, comprising: locating a multiple aperture device as herein before described proximal to the substrate surface; supplying the liquid to the substrate surface via the device; moving the device relative to the substrate surface with the liquid in each aperture contacting with the substrate surface; and, retracting the device from the substrate surface. The device may be oriented relative to the substrate surface such that traces of the liquid produced as the device is moved relative to the substrate surface remain separate. Similarly, the device may be oriented relative to the substrate surface such that traces of the liquid produced as the device is moved relative to the substrate surface overlap. Prior to locating, a similar liquid may be loaded into the chambers. Alternatively, different liquids may be loaded into the chambers.

The present invention further extends to a method for applying a liquid to a substrate surface, comprising: locating an array of two aperture devices as herein before described proximal to the substrate surface; supplying the liquid to the substrate surface via the array; in each device of the array, flowing the liquid from the first chamber to the second chamber via the flow path; moving the array relative to the substrate surface with the liquid in each aperture contacting with the substrate surface; and, retracting the array from the substrate surface. In at least one device of the array, the flow of the liquid from the first chamber to the second chamber may be varied during the supply of the liquid to the surface. The array may be oriented relative to the substrate surface such that traces of the flows of liquid produced as the array is moved relative to the substrate surface remain separate. Similarly, the array may be oriented relative to the substrate surface such that traces of the flows of liquid produced as the array is moved relative to the substrate surface overlap. Similar or different liquids may be loaded into each device of the array.

In one embodiment of the present invention, a single chamber device as herein before described, is brought close to a surface so as to contact the surface with the liquid in an area of micrometer dimensions defined by the geometry of the aperture. The device is then removed from the surface. In another embodiment of the present invention, prior to removal of the device, the surface is laterally moved relative to the device with the liquid in the device remaining in contact within the surface so that the liquid is traced across the surface. In yet another embodiment of the present invention, the tracing is performed using the two aperture device herein before described, with the liquid flowing between the apertures as the device is traced is over of the surface.

As indicated earlier, devices embodying the present invention are particularly useful for transporting liquid from a chamber, well, reservoir, or similar container, to a surface, and to confine the liquid on the surface without need for a physical seal. Thus, the or each aperture of such device may be defined by non-sealing materials such as silicon or the like. The non-contact operation of devices embodying the present invention prevents contamination or other damage to the surface being treated and to the device.

Treatment techniques embodying the present invention are applicable to surfaces having wide range of different properties and wettability. The two aperture device herein before described permits addition of a flow of liquid, thus preventing depletion of material adsorbed to the surface treated. Homogeneous patterns of, for example, biomolecules may be thereby produced. When a device embodying the present invention is traced over the surface treated, the lines produced may be smoother than those possible with conventional techniques, such as ink jet printing. Because the liquid deposited is relatively small, there is no spreading, drying is quick, and does not lead to excessive accumulation of material on the surface, such lines may be made smaller than possible with conventional techniques.

If a flow is applied, via a two aperture device as herein before described, the concentration of deposited materials may be varied as the device is drawn of the surface treated. A range of gradients in concentration may be thus produced, depending on application. Such a device is useful for both additive and subtractive patterning of materials onto a surface. A series of such devices may drawn over a surface in sequence. Each aperture of such devices may contain a different one of a group of reagents for collectively implementing a chain reaction on the surface.

Another advantage associated with devices embodying the present invention is that they can be pre-filled with processing liquids for subsequent repetitive application and removal from areas of surfaces to be processed. Surface processing can be repeated multiple times from the same device without refilling and thus delay. Yet another advantage associated with such devices is that they can be swiftly mass produced via conventional microfabrication techniques. In typical applications, a device embodying the present invention can be placed at an arbitrary location on a surface and process parameters can be controlled via dimensions and contact time. Arrays of such devices are relatively easy to fabricate.

Another advantage associated with devices embodying the present invention is that they can be used to treat curved surfaces such as beads or cylinders, inhomogeneous surfaces, surface with variable wettability, corrugated or otherwise roughened surfaces and the like.

Devices embodying the present invention may be employed to deposit biomolecules in selected regions of a surface to make bio-arrays, thus facilitating mass fabrication of bio-chips. Devices embodying the present invention can be equally employed in subjecting selected areas of a surface to other processes, such as processes for: repairing pattern defects on a surface; etching specific areas of a surface; depositing metal on a surface; localizing an electrochemical reactions on a surface; depositing catalytic particles for electroless deposition of metals, deposition glass or latex beads or other particles on a surface; passivating specific areas of a surface; patterning proteins, DNA, cells, or other biological entities on a surface; making assays; and, staining cells.

Preferred embodiments of the present invention will now be described, by way of example only, with reference to the accompanying drawings, in which:

FIG. 13 is a plan view of the device shown in FIG. 1 operating in a drawing mode;

FIG. 14 is a plan view of a surface treated by the drawing operation shown in FIG. 13;

FIG. 15 is a plan view of the device shown in FIG. 5 operating in a dawning mode;

FIG. 16 is a plan view of a surface treated by the drawing operation shown in FIG. 15;

FIG. 17 is a plan view of the device shown in FIG. 7 operating in a drawing mode; and, FIG. 18 is a plan view of a surface treated by the drawing operation shown in FIG. 17; and, FIG. 19 is a cross section side view of another device embodying the present invention in operation.

Figure 1:
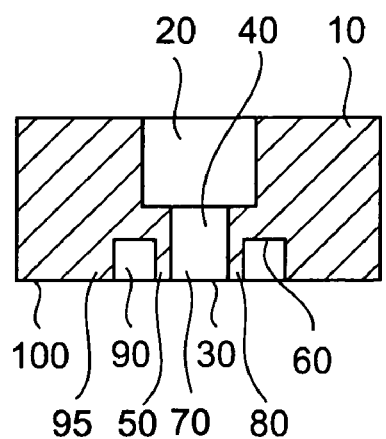
FIG. 1 is a cross sectional side view of a device embodying the present invention.
Figure 2:
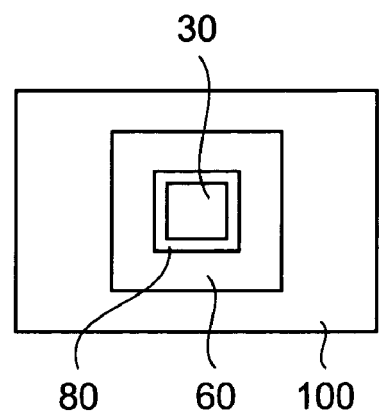
FIG. 2 is a plan view of a bottom surface of the device shown in FIG. 1.

Referring first to FIGS. 1 and 2 in combination, an example of a device embodying the present invention comprises a body 10 formed from a material such as PDMS, silicon, SU-8 photoresist, polymers, ceramics and metals. A chamber 20 is formed on one side of the body 10. The chamber 20 connects to an aperture 30 open to the other side of the body 10 via a necked portion 40 or channel. The aperture 30 is formed in a protrusion 50 extending from a plane inner surface 60. The interior walls of the chamber 20, the interior walls 70 of the aperture 30 and the end 80 the protrusion 50 are wettable by the liquid. The exterior walls 90 of the protrusion 50 and the inner surface 60 are non-wettable. In other embodiments of the present invention, the end 80 may be non-wettable. The protrusion 50 is surrounded by the inner surface 60. In turn, the inner surface 60 is surrounded by a non-wettable plane outer surface 100 parallel to the inner surface 60. The inner surface 60 and its interior walls 95 are non-wettable. The outer surface 100 and the end 80 of the protrusion 50 are coplanar, so that the inner surface 60 resides in a recess surrounding the aperture 30.

Different techniques may be employed to apply surface wettability patterning to the device. For example, surfaces to be made non-wettable may be inked via a stamp with a thiol having a non wettable end group. Surfaces to be made wettable may be exposed to a thiol having a wettable end group in solution. The solvent may be ethanol, for example. Temporary PDMS sealing may be employed to mask applications of wettability and non-wettability agents from each other. The ink may be applied via a stamp. In other examples, both the wettability and non wettability agents may be supplied in solution. The geometry of the device may provide a capillary network to guide such agents to desired surfaces of the device. The surfaces may be pretreated with a primer layer of gold or similar noble metal. Such a primer layer may be applied by evaporation, sputtering, or the like.

Figure 3:
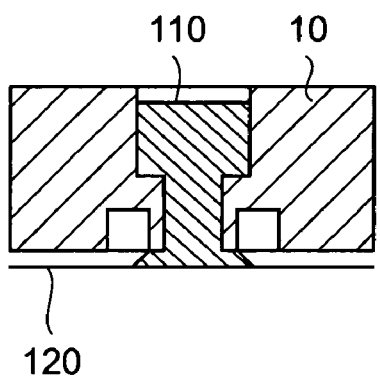
FIG. 3 is a cross sectional side view of the device shown in FIG. 1 in operation.
Figure 4:
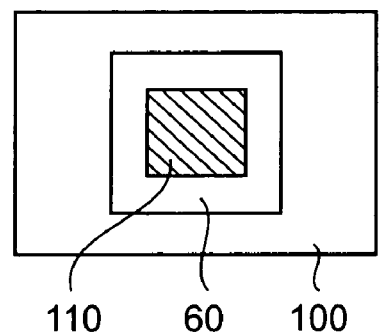
FIG. 4 is a plan view of a bottom surface of the device shown in FIG. 1 in operation.

Referring now to FIGS. 3 and 4 in combination, in operation, the chamber 20 is loaded with a liquid 110 to be dispensed onto a surface 120 to be treated. The surface 120 may be a glass surface. However, the surface 120 may have other forms The surface 120 can be flat, rough, corrugated, porous, fibrous, and/or chemically inhomogeneous. The liquid 110 is retained in the chamber 20 by the combined action of surface tension at the aperture 30 and pressure in the chamber 20. The pressure in the chamber 20 is preferably set to negative values, P<0. This contributes to retaining liquid 110 in the chamber 20. The aperture 30 provides a capillary or meniscus pressure exerting a negative pressure OP<0 on liquid 110. If one likes to keep the aperture filled with liquid, he can tune P such as OP<P. OP then sucks liquid 110 from the chamber 20 into aperture 30. Aperture 30 widens at its intersection with the end 80, thereby suppressing the capillary pressure. P may even be greater than or equal to 0, in which case the aperture 30 is overfilled with liquid 110. This leads to liquid 110 having a convex surface. Such a surface is a source of positive pressure albeit of relatively low magnitude. In such a case, aperture 30 is filled with liquid 110 up to the intersection with the end 80. Relatively small dimensions of aperture 30 are desirable for forming relatively high curvatures in the surface of liquid 110. By virtue of tension between liquid 110 and the surrounding medium, such curvatures produce relatively high pressures that can confine liquid 110 within aperture 30 despite a positive pressure head.

In operation, the aperture 30 is brought proximal to the surface 120. By tuning the pressure P in the chamber 20, the liquid fills the aperture 40 so that the liquid 110 contacts the surface 120. The non-wettable walls 90 and 95, the recessed inner surface 60, and non-wettable outer surfaces 100 cooperate to confine the liquid 110 contacting the surface 120 to an area of the surface 120 commensurate with the cross-sectional width of the aperture 30. Contact between the surface 120 and liquid 110 can be curtailed applying a pressure P to the chamber to aspirate excessive liquid from the surface, and by simultaneously or subsequently disengaging the device from the surface 120. Liquid contacts 110 may be may be made and broken by alternately engaging and disengaging the device with the surface 120.

In operation active flow controllers such as external pumps, integrated pumps, and valves may be provided to regulate the pressure P in the chamber 20.

A plurality of a capillary members may extend into the chamber 20 and act as flow controller. The capillary members form a capillary network exerting capillary action on the liquid 110. The capillary members may have circular, hexagonal, square, rectangular, or other cross sections. Alternatively, the flow controllers may each comprise a different form of capillary network, such as a network formed from mesh, porous, or fibrous material.

The supply of liquid 110 can be replenished as necessary via the chamber. Such replenishing permits repetitive reuse of the device. The chamber may be loaded and/or unloaded with liquid 110 from below via the aperture 30. A lid may be provided to close the chamber. The lid may be permanently sealed so that liquid 110 can only be introduced via the aperture 30. The apertures 30 may be likewise provided with a lid to prevent evaporation during periods of nonuse. A support device having a reservoir for liquid 110 may be provided for filling, refilling, and draining the chamber without involving removal of lids.

Liquid 110 may contain treatment agents for processing a region of the surface 120. Engaging the device with the surface 120 causes exposure of the region of the surface 120 facing the end 80 to the treatment agent. The treatment agent may comprise molecules. The device is therefore useful in bio-patterning applications. However, other applications are possible, such as sequential delivery of different treatments to the surface 120. Similarly, other liquids may be employed depending on the surface processing desired. Examples of possible liquids include etchants and the like for producing localized chemical reactions on the surface 120.

The body 10 may be formed from elastomeric or rigid materials. Such materials can be shaped by microfabrication techniques such as photolithography, etching, injection molding and the like. The body 10 may be unitary in construction or an assemblage of parts such as a layered assembly. Each layer may toured from a different material such as elastomer, silicon, SU-8 photoresist, thermoplastics, ceramic, and metal.

A manipulator may be employed to position the device relative to the surface 120. The manipulator may be manually controlled or automatically controlled via a programmable computer or similar electronic control system. The manipulator may act on the device, the surface 120, or both, providing control of in plane and/or out of plane translational and/or rotational relative motions.

A plurality of devices as herein before described with reference to FIGS. 1 to 4 may be ganged together in an array. For example, referring to FIGS. 5 and 6 in combination, such an array may comprise two apertures 31 and 32 extending from separate chambers. Each chamber may contain the same liquid or different liquids. Other arrays may comprise more than two apertures. Groups of such apertures may share a common chamber.

Figure 7:
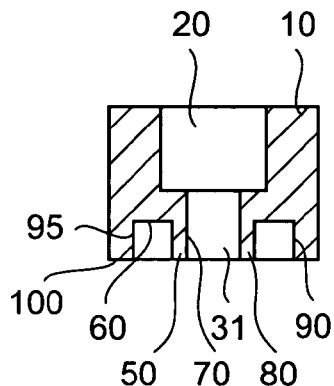
FIG. 7 is a cross sectional end view of yet another device embodying the present invention.
Figure 8:
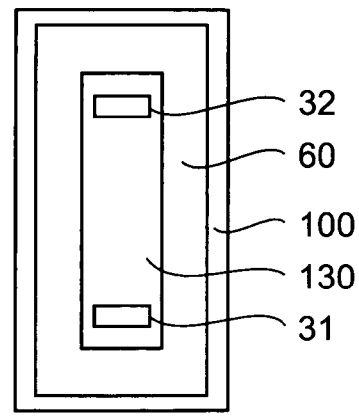
FIG. 8 is a plan view of a bottom surface of the device shown in FIG. 7.

With reference to FIGS. 7 and 8 in combination, in another embodiment of the present invention, the apertures 31 and 32 are interconnected via an intervening flow path 130. The apertures 31, 32, and the flow path 130 are together formed in the protrusion 50 from the inner surface 60. The flow path 130 and the end 80 of the protrusion 50 are substantially coplanar. The interior walls of the chambers 20, the interior walls 70 of the apertures 31, 32, the end 80 of the protrusion 50, and the flow path 130, are wettable by the liquid. Again, the exterior walls 90 of the protrusion 50 are non-wettable. The protrusion 50 is surrounded by the inner surface 60. In turn, the inner surface 60 is surrounded by the non-wettable outer surface 100. The outside walls 95 that connect the inner surface 60 to the outer surface 100 may be non-wettable too. The outer surface 100 and the end 80 of the protrusion 50 are coplanar, so that the inner surface 60 resides in a recess surrounding the apertures 31, 32 and the flow path 130. The flow path 130 may be straight or curved. The flow path 130 may include a recess formed between the apertures 31 and 32 of rounded or rectangular cross section. In operation, the chamber 20 connected to aperture 31 acts as a fill port and the chamber 20 connected aperture 32 acts as a flow promotion port. The liquid 110 is initially introduced to the fill port.

Figure 9:
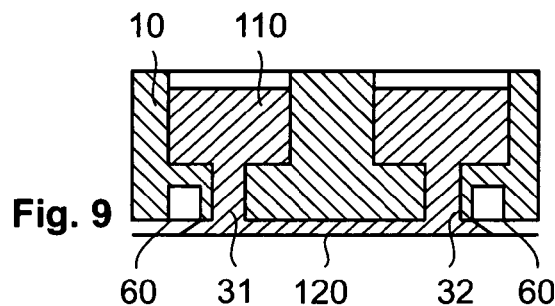
FIG. 9 is a cross sectional side view of the device shown in FIG. 7 in operation.
Figure 10:
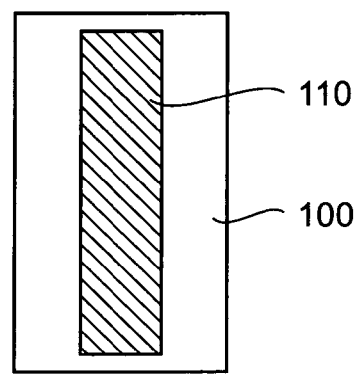
FIG. 10 is a plan view of a bottom surface of the device shown in FIG. 7 in operation.

Referring to FIGS. 9 and 10 in combination, in operation, the fill port holds liquid 110 at pressure P1. P1 is preferably negative. P1<0. This contributes to retaining liquid 110 in the fill port. Aperture 31 from the fill port provides a capillary or meniscus pressure exerting a negative pressure OP1<0 on liquid 110.

A tip (not shown) wettable to the liquid 110 may extend from the body 10 into the flow path 40 adjacent aperture 31. The tip sucks up the liquid 110 to its end by capillary force. The tip may be resilient to prevent damage to the device or the surface 120. There may be multiple tips spaced along the flow path 40 to ensure uniform spacing between the flow path 40 and the surface 120.

Engagement of the device with the surface 120 creates a surface channel corresponding to the flow path 130. If provided, tips inside and outside of the flow channel abut the surface 120 to define the size of the surface channel, together with the flow path 130. The pressure P1 initiates the flow of liquid by expelling the liquid from the aperture 31 into the flow path 130. P1 is tuned so that the liquid enters the flow path 130 but does not spread out on the surface. The depth of the surface channel, the interfacial tension of the liquid, the contact angle of the liquid on the substrate surface and on the outer walls 90 define the maximal pressure head that the channel can withstand. Further, the surface channel generates a capillary pressure CP on the liquid 110 while the liquid 110 fills the surface channel from the aperture 31 to the aperture 32. For a capillary pressure CP<0, CP will help propel the liquid from the aperture 31 to the aperture 32. The magnitude of CP is determined by the surface tension of liquid 110, the contact angles of liquid 110 with the flow path 130 and the surface 120, and the size of the gap formed between the flow path 130 and the surface 120. CP may be tuned by varying the size of the gap between the surface 120 and the device. The smaller the gap, the higher the magnitude of CP. Having a wettable surface channel 130 will help lowering CP to small and negative values.

When the liquid 110 reaches and covers the aperture 32, the liquid 110 is subjected to the pressure P2 in the flow promotion port. Further, the liquid is also subjected to the capillary pressure of the aperture 32, OP2. If the walls of the aperture 32 are wettable, OP2<0, and OP2 will help suck the liquid into aperture 2. Thus, when liquid 110 reaches aperture 32, it is drawn into aperture 32 and propelled towards the promotion port. In turn, the promotion port exerts a pressure P2<P1 on liquid 110. Thus, P2 supports a flow of liquid 110 from the fill port to the promotion port. The flow rate is a function of the ratio (P1-P2)/Fr, where Fr is the flow resistance of the flow path from fill port to flow promotion port for the liquid 110.

If the gap increases, the magnitude of CP reduces. By applying a slight negative pressure in at least one of fill port and flow promotion port, the liquid 110 is sucked into at least one of the apertures 31, 32 and uncontrolled spreading of the liquid 110 on the substrate surface 120 can be effectively prevented. The drainage causes disruption of the flow of liquid 110.

In another application, the flow of liquid is automatically started when the device is engaged with the surface 120. The surface channel provides a capillary pressure, CP. CP propels liquid 110 from aperture 31 to aperture 32. CP<P1 and CP<0. The magnitude of CP is determined by the surface tension of liquid 110, the contact angles of liquid 110 with the flow path 130 and the surface 120, and the size of the gap formed between the flow path 130 and the surface 120. CP may be tuned by varying the size of the gap between the surface 120 and the device. The smaller the gap, the higher the magnitude of CP.

Aperture 32 provides a capillary or meniscus pressure. This pressure exerts a negative second pressure OP2<0 on liquid 110 in the flow path 130. OP2<P1. Thus, when liquid 110 reaches aperture 32, it is drawn into aperture 32 and propelled towards the promotion port. In turn, the promotion port exerts a negative pressure P2<0 on liquid 110. P2<P1. Thus, P2 supports a flow of liquid 110 from the fill port to the promotion port. The flow rate is a function of the ratio (P1-P2)/Fr, where Fr is the flow resistance of liquid 110. Capillary pressure retains liquid 110 in the flow path 130.

If the gap increases, the magnitude of CP reduces. Eventually, CP reaches a threshold value. Below the threshold value, liquid 110 in the flow path 130 drains first into the fill port, and then, provided that P1<0, into the promotion port. The drainage causes disruption of the flow of liquid 110. The flow of liquid 110 can be curtailed simply by disengaging the device from the surface 120. Flow of liquid 110 can be alternatively initiated and stopped by alternately engaging and disengaging the device with the surface 120.

The tip may be omitted and flow initialization effected by other techniques. For example, flow initialization may be effected by first bringing the end 80 into contact with the surface 120 so that liquid 110 contacts and wets the surface 120. The device is then withdrawn from the surface 120 to a distance equal to the desired depth of surface channel. Capillary pressure then transports liquid 110 along the flow path 130 until the liquid reaches the promotion port, whereupon the pressure difference between the ports maintains the flow. Flow initialization may also be achieved by locating the device close to the surface 120 in a humid environment. The device and/or the surface may be initially cooled to promote condensation, thereby further stimulating flow. Alternatively, an electric field may be applied between the device and the surface in the interests of stimulating liquid 110 in aperture 31 to contact the surface 120. Similarly, a pressure pulse may be applied to liquid 110 in aperture 31 to stimulate contact with the surface 120. Alternatively, a heat pulse may be applied to the liquid 110 to initialize the flow of liquid 110 via vaporization of the liquid 110.

The flow path 130 may have a curved cross section to prevent unwanted liquid retention, and residual flows between the chambers. Alternatively, the flow path 130 may have a rectangular cross section. This may lead to residual flow along corners of the flow path 130 when separated from the surface 120. Such residual flows may prevent concentration of reagents by evaporation of liquid 110. The capillary pressure of the flow path 130 when remote from the surface 120 can be optimized by tuning wettability and geometry together with P1 and P2 to prevent unwanted liquid retention and to limit the residual flow to a desired value.

The direction of flow of liquid 110 may be selectively reversed by selectively reversing the pressure difference between the fill and promotion ports. Specifically, P1 may be selectively made greater in magnitude than P2. The flow path 130 can be filled with liquid 110 even if the device is slightly tilted relative to the surface 120. The device may be operated facing upwardly towards a downwardly facing surface, especially where device dimensions are very small, such that forces in the liquid interface exceed inertial forces. In general, gravity has limited effect on the device so that use in reduced gravity environments is possible.

Confinement of the liquid 110 on the surface 120 is achieved via geometry and wettability of the device. The end 80 of the protrusion 50 facing the surface 120 is made more wettable by liquid 110. However, side walls 90 of the protrusion 50 are made less wettable by liquid 110. There is no spread of liquid 110 because of the right angle between the side walls 90 and the surface 120 and because of the reduced wettability of the side walls 90. This confines the liquid 110 on the surface 120 to an area roughly corresponding to the area of the end 80 of the protrusion 50.

The flow path 130 is around 100 micrometers long and 100 micrometers wide. Likewise, the apertures 30-32 may be around 100 micrometers wide. The surface channel may be between around 1 and 10 micrometers deep. The volumes of the chambers may be around 500 nanoliters each. The depth of the surface channel cannot exceed the width of the surface channel. The maximum depth of the surface channel is equal to the width of the surface channel. It will appreciated that different dimensions are possible.

There may be multiple fill ports coupled to a single promotion port via a common flow path 130. Different reactive agents may be introduced to each of the fill ports for reaction within the flow path 130. The flow path 130 may thus act as a reaction chamber activated by proximity of the surface 120. Similarly, there may be multiple promotion ports connected to a common fill port via common flow path 130. Equally, there may be multiple fill ports connected to multiple promotion ports via a common flow path 130.

Referring to 11 and 12, multiple devices as herein before described with reference to FIGS. 7 to 10 may be integrated to form an array. Different configurations of such an array are possible, involving different numbers of devices. The chambers of such arrays may be interconnected to form a cascade. Some of the interconnected chambers may provide reaction chambers in which liquid 110 reacts. The product of such reactions may be analyzed in other chambers or on the surface 120. Such products may be used to treat or react with the surface 120.

Referring now to FIG. 13, a device as herein before described with reference to FIGS. 1 to 4 may be employed to trace liquid 110 across the surface 120 via planar movement of the device relative to the surface 120 with the end 80 of the device in contact with the surface 120. Referring to FIG. 14, a trail of liquid 110 is thus left on the surface.

Figure 5:
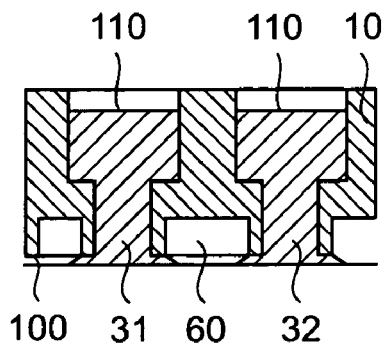
FIG. 5 is a cross sectional side view of another device embodying the present invention.
Figure 6:
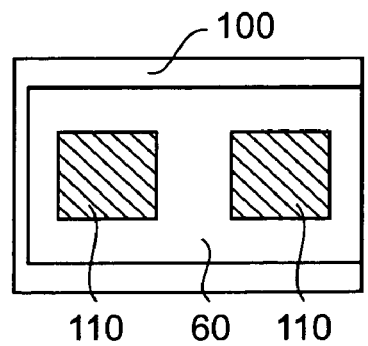
FIG. 6 is a plan view of a bottom surface of the device shown in FIG. 5.

Similarly, with reference to FIG. 15, a device as herein before described with reference to FIGS. 5 and 6 may be employed to trace different liquids across the surface 120, each liquid being loaded into a different chamber 20 of the device. Referring to FIG. 16, depending the orientation and motion of the device relative to the surface 120, the different liquids can be mixed in selected regions of the surface 120. Such mixing may, for example, facilitate localized reactions between the liquids in selected regions of the surface 120. Equally a device as herein before described with reference to FIGS. 5 and 6 may be employed to trace similar liquids across the surface in separate trails. Depending the orientation and motion of the device relative to the surface 120, the trails can be separate or superimposed on each other.

Figure 11:
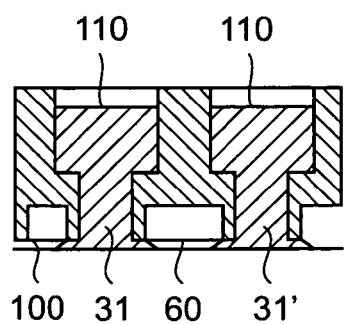
FIG. 11 is a cross sectional end view of yet another device embodying the present invention.
Figure 12:
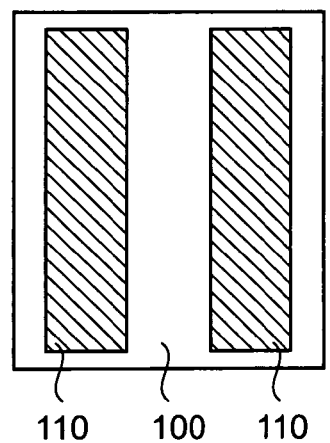
FIG. 12 is a plan view of a bottom surface of the device shown in FIG. 11 in operation.

A device as herein before described with reference to FIGS. 7 to 10 may be likewise employed trace a flow of liquid 110 across the surface 120. Independent control of flow rate and tracing speed permits tuning of the surface treatment applied via the device. Referring to FIG. 17, two or more such devices may be mounted in an array as herein before described with reference to FIGS. 11 and 12. Such an array may also be employed to trace two liquid flows across the surface 120. Referring to FIG. 18, the liquid flows may comprise the same or different liquids. Again, depending the orientation and motion of the device relative to the surface 120, the trails of the liquid flows can be separate or superimposed on each other. Independent control of the tracing speed and flow rate permits creation of gradients in, for example, adsorbed molecules on the surface.

Figure 19:
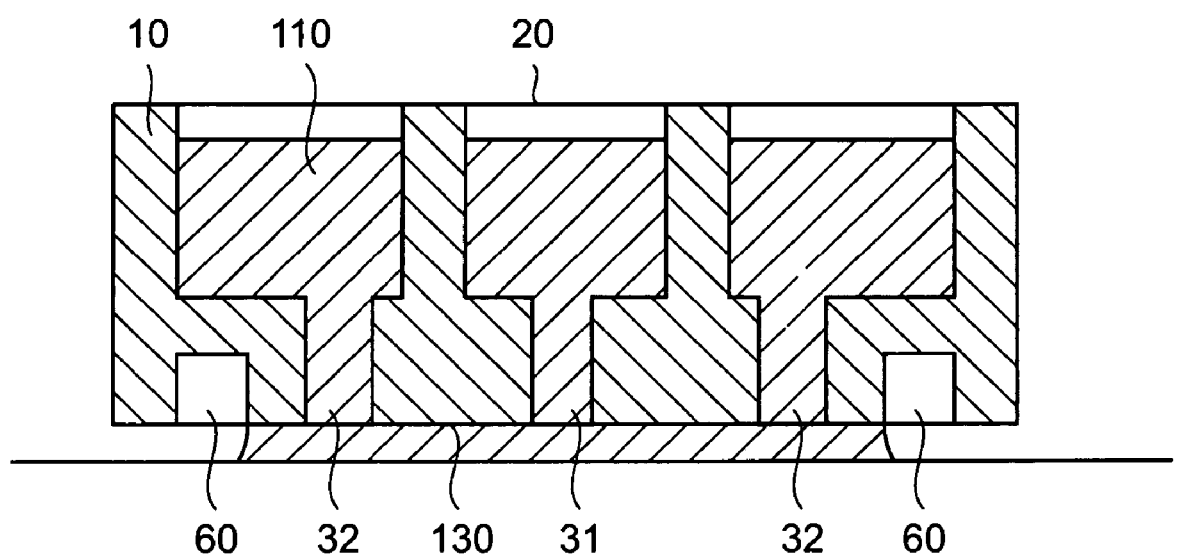

Referring to FIG. 19, in other embodiments of the present invention, the first aperture 31, the second aperture 32, and the intervening flow path 130 may be nested. For example, in one such example of the present invention, the first aperture 31 is surrounded by the second aperture 32. The inner surface forms an annular recess surrounding the second aperture 32. The circumferential outer wall of the second aperture 32 is of limited wettability as herein before described. An annular flow path 130 is disposed between the first aperture 31 and the second aperture 32. In operation, once contact between the liquid 110 in the first aperture 31 and the surface 120 to be treated is established, flow of liquid 110 extends radially from first aperture 31 to the second aperture 32. The second aperture 32 may be continuous or defined by a series of circumferentially spaced openings each connecting to the promotion port. It will be appreciated that the form of the first aperture 31, the flow path 130, and the second aperture 32, need not be circular. Other examples of nested versions of the present invention may have different nested geometric forms, such as square, triangular, or more complex nested geometric forms.

Embodiments of the present invention have been described herein with reference to devices having less and more wettable surfaces. In such devices, confinement of liquid 110 is achieved via interfacial tension. The interfacial tension is a function of surface tension, surface wettability and geometrical parameters in combination. The associated confinement pressure can be achieved via a wettability difference between different device sides and device geometry. The confinement conditions are a function of contact angles of the liquid 110 with the faces of the device, surface tension in the liquid 110, pressures and flow rates. Preferable confinement conditions are obtained by superposing a wettability pattern on the geometry.

The invention claimed is:

1. A device far applying a liquid to a substrate surface, the device including a body comprising:
   at least one first chamber for carrying the liquid;
   at least one second chamber for carrying the liquid;
   a first aperture in the first chamber for communicating liquid from the first chamber to the substrate surface via a first conduit having outer sides of limited wettability to the liquid; and
   a second aperture in the second chamber for communicating liquid from the second chamber to the substrate surface via a second conduit having outer sides of limited wettability to the liquid;
   a protrusion defined by the outer sides of the first and second conduits, wherein the body comprises a plane inner surface surrounding the protrusion and a plane outer surface parallel to, offset from, and surrounding the inner surface, the protrusion extending from the inner surface and having an end coplanar with the outer surface, wherein the end of the protrusion is wettable by the liquid, and wherein the end of the protrusion comprises a flow path extending from the first aperture to the second aperture, wherein,
   the first and second conduits comprise inner sides wettable by the liquid;
   wherein the inner surface forms a peripheral recess surrounding the protrusion;
   the outer surface is of limited wettability to the liquid;
   the first chamber has a first pressure for retaining the liquid when the flow path is remote from the substrate surface;

the second chamber has a second pressure such that the difference between the first and second pressures is oriented to promote flow of the liquid from the first chamber to the second chamber via the flow path in response to the flow path being located proximal to the substrate surface and the liquid in the device contacting the substrate surface;

the first and second pressures are such that the liquid is drawn towards at least the second chamber in response to withdrawal of the flow path from the substrate surface;

at least one of the first chamber and the second chamber comprises a capillary network for applying pressure to the liquid;

each capillary network comprises at least one of a plurality of parallel capillary members, a mesh, a porous material, and a fibrous material; and further comprising a plurality of first chambers each coupled to the flow path;

a plurality of second chambers each coupled to the flow path, wherein:

the flow path has one of a curved cross section and a rectangular cross section;

the first and second pressures are such that the liquid is drawn towards the first chamber and the second chamber in response to withdrawal of the flow path from the substrate surface;

the second aperture surrounds the first aperture, and being of layered construction, wherein each layer is formed from one of polymer, glass, silicon, SU-8 photoresist, thermoplastic, metal, and ceramics.

\* \* \* \* \*